(12) United States Patent
Jönsson et al.

(10) Patent No.: US 6,901,661 B2
(45) Date of Patent: Jun. 7, 2005

(54) METHOD FOR MANUFACTURING A VANE TO A GAS TURBINE COMPONENT AND A METHOD FOR MANUFACTURING A GAS TURBINE COMPONENT

(75) Inventors: Bertil Jönsson, Bjarred (SE); Lars Sundin, Malmo (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 10/249,828

(22) Filed: May 9, 2003

(65) Prior Publication Data

US 2003/0172530 A1 Sep. 18, 2003

Related U.S. Application Data

(63) Continuation of application No. PCT/SE01/02061, filed on Sep. 25, 2001, now abandoned.

(30) Foreign Application Priority Data

Nov. 9, 2000 (SE) .............................................. 0004138

(51) Int. Cl.[7] .............................................. B21D 53/78
(52) U.S. Cl. .................................... 29/889.721; 29/557
(58) Field of Search ...................... 29/889.721, 889.72, 29/889.7, 557, 558; 416/97, 232, 231, 236

(56) References Cited

U.S. PATENT DOCUMENTS

| | | | | |
|---|---|---|---|---|
| 3,934,322 A | * | 1/1976 | Hauser et al. | 29/889.7 |
| 3,957,104 A | * | 5/1976 | Terpay | 164/132 |
| 4,672,727 A | * | 6/1987 | Field | 29/889.7 |
| 4,827,587 A | * | 5/1989 | Hall et al. | 29/889.721 |
| 5,152,059 A | * | 10/1992 | Midgley | 29/889.7 |
| 5,392,515 A | * | 2/1995 | Auxier et al. | 29/889.721 |
| 5,511,309 A | * | 4/1996 | Beabout | 29/889.721 |
| 5,914,060 A | * | 6/1999 | Flies et al. | 29/889.721 |
| 6,214,248 B1 | * | 4/2001 | Browning et al. | 29/889.721 |
| 6,254,333 B1 | * | 7/2001 | Merry | 415/115 |
| 6,405,435 B1 | * | 6/2002 | Konter et al. | 29/889.7 |

* cited by examiner

Primary Examiner—David P. Bryant
(74) Attorney, Agent, or Firm—Navak Druce & Quigg, LLP

(57) ABSTRACT

Method for manufacturing a vane (1) to a gas turbine component intended for guiding a gas flow. The vane (1) is produced by casting, and an internal hole (3) for coolant is then cut out of the cast vane (1). The vane (1) is provided with a starter hole (5), either during casting or once casting is completed, following which the internal hole (3) for coolant is cut out of the vane, proceeding from the starter hole. A method is also disclosed for manufacturing a gas turbine component including a plurality of vanes (1) for guiding a gas flow. The gas turbine component is cast in such a way that it includes the vanes and an internal hole (3) for coolant is then cut out of each of the vanes.

21 Claims, 4 Drawing Sheets

METHOD FOR MANUFACTURING A VANE TO A GAS TURBINE COMPONENT AND A METHOD FOR MANUFACTURING A GAS TURBINE COMPONENT

CROSS REFERENCE TO RELATED APPLICATIONS

The present application is a continuation patent application of International Application No. PCT/SE01/02061 filed Sep. 25, 2001 which was published in English pursuant to Article 21(2) of the Patent Cooperation Treaty and which claims priority to Swedish Patent Application No. 0004138-4 filed Nov. 9, 2000. Both applications are expressly incorporated herein by reference in their entireties.

BACKGROUND OF INVENTION

The present invention relates to a method for manufacturing a vane to a gas turbine component, and in which the vane is intended for guiding a gas flow, and the vane is made by casting. The invention also relates to a method for manufacturing a gas turbine component.

The term gas turbine is intended to mean a unit, which comprises at least one turbine and a compressor driven by the former, together with a combustion chamber. Gas turbines are used, for example as engines for vehicles and aircraft, as prime movers for vessels and in power stations for producing electricity.

The term gas turbine component is intended to mean a stator or a rotor. The gas turbine component may consist of both a radial and axial stator or rotor.

A gas turbine comprises (includes) a compressor turbine, the stator of which is that part of the gas turbine that is exposed to the highest temperature during operation of the gas turbine. In order to obtain a high efficiency, the highest possible compressor turbine inlet temperature is desirable. One method of achieving this is to cool the stator vanes, particularly in the rear area of the vanes.

DESCRIPTION OF THE PRIOR ART

One casting method commonly used for the manufacture of a vane for a gas turbine component is the lost wax casting method. According to this method, a wax pattern is manufactured. A ceramic core is used in order to produce an internal cooling duct in the vane. The core is held in place in the tool that forms the wax pattern. Once the wax pattern has been made, a liquid ceramic mass is applied around the wax pattern by immersion in order to build up a shell. The wax pattern is then removed by being melting out. This leaves the shell with the ceramic core inside. Molten metal is then poured down into the shell and made to solidify around the core. The shell is then broken up leaving a metal vane with a remaining ceramic core. The ceramic core is removed by chemical treatment. More specifically, the vane is lowered into a vessel containing a liquid that attacks the core, thereby dissolving the latter.

Disadvantages to this method include the fact that it is difficult to hold the core with any high degree of accuracy in the intended position in the molding tool that forms the wax pattern and in the mold during casting. This problem is especially pronounced where the vane is of smaller dimensions. This problem leads to a relatively large scrap rate for vanes that are manufactured in this way.

SUMMARY OF INVENTION

A first objective of the invention is to provide a method for the manufacture of vanes for a gas turbine component that affords greater accuracy in the location and shape of the coolant hole than is currently possible based on the present state of the art.

This objective is achieved by way of an internal hole for coolant being cut out of the cast vane. Very accurate methods are now available for cutting holes in bodies.

According to a preferred embodiment, the vane is provided with a starter hole, and the internal hole for coolant is cut out of the vane proceeding from the starter hole. More specifically, the starter hole is located inside the intended boundary line of the ultimate coolant hole and the coolant hole is then cut out, proceeding from the starter hole. To this purpose the starter hole is smaller than the ultimate coolant hole, and the precision in locating the former need not be as high as the precision in locating the subsequent coolant hole.

According to a preferred embodiment, the starter hole is cast into the vane. A core is used during casting that defines the shape of the starter hole. In an alternative to using the core for the starter hole, the starter hole can be machined into the vane after casting, for example by drilling. The latter solution eliminates the need for a core in order to define the shape of the coolant hole during casting, which results in a cost-effective casting process.

According to a further development of the preceding embodiments, the coolant hole is cut out by wire electro-discharge machining (EDM). This is a cutting process that enables the provision of cutouts with very high accuracy.

A second objective of the invention is to manufacture a gas turbine component having a plurality of vanes for guiding a gas flow by a method that is more cost-effective than the present state of the art. This is achieved by a vane holder structure being manufactured and vanes that can be manufactured in the manner stated above are fitted in the vane holder structure. The vane holder structure is preferably manufactured by casting.

A third objective of the invention is to provide a method for the manufacture of a gas turbine component including a plurality of vanes for guiding a gas flow that enables greater accuracy in the location and shape of the coolant hole than is currently possible based on state of the art techniques. This objective is achieved by way of the gas turbine component being cast in such a way that it comprises the vanes, and that an internal hole for coolant is cut out of each of the vanes after casting.

Other preferred embodiments and advantages of the invention are set out, and will become apparent from the description and claims below.

BRIEF DESCRIPTION OF DRAWINGS

The invention will be described in more detail below with reference to the embodiments shown in the attached drawings wherein.

DETAILED DESCRIPTION

Figure 1:
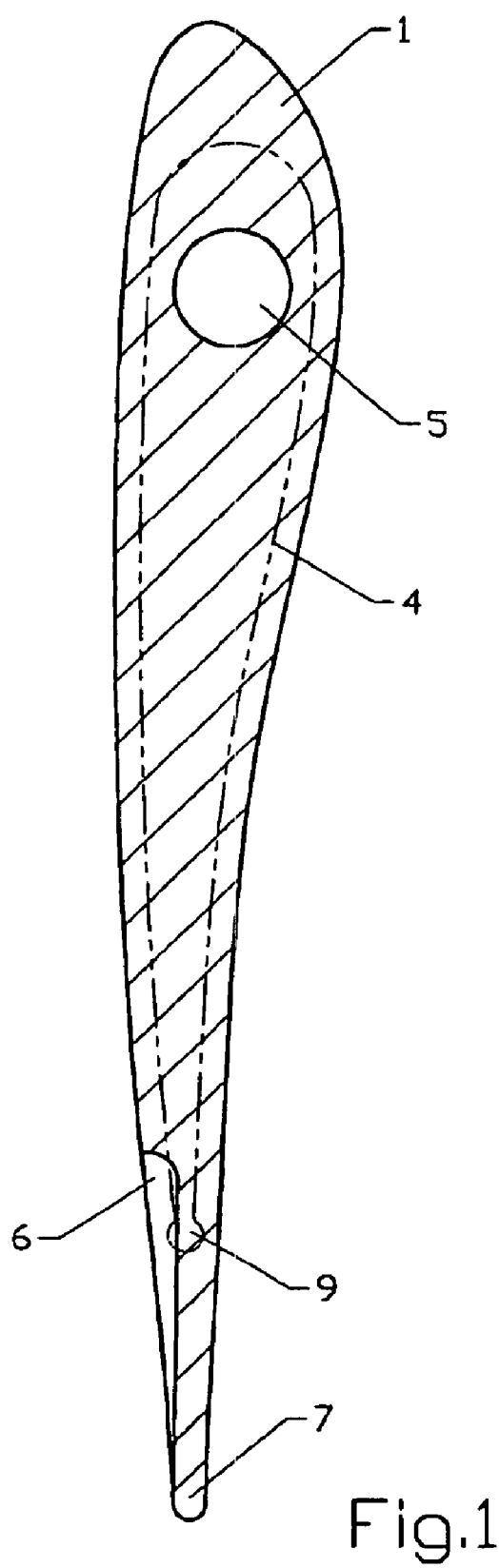
FIG. 1 is a cross-sectional view of a vane for a stator of the radial type, after being cast.

In the method of manufacture according to one embodiment of the present invention, a vane 1 for a radial stator 2 is cast in a first manufacturing stage. In a second manufacturing stage, an internal hole 3 for coolant is cut out of the vane 1 as may be appreciated from FIGS. 1 and 2. The coolant may be air, for example. The intended shape of the coolant hole 3 is illustrated by a dashed line 4 in FIG. 1.

According to one preferred embodiment of the invention, a core is used to define a starter hole 5 during a casting stage of the manufacturing process. In second manufacturing stage, the internal hole 3 for coolant is cut out of the vane 1 proceeding from the starter hole 5. In order to achieve optimum cooling of the vane, this has a small (thin) wall thickness. The coolant hole 3 also has a cross-sectional shape essentially corresponding to the cross-sectional shape of the vane 1. The coolant hole 3 has a rounded shape, a so-called keyhole shape, in the end 9 of the hole facing the rear end 7 of the vane 1, with the aim of reducing the risk of incipient fracture.

The cutting out of the coolant hole 3 can be exemplarily performed by wire electrodischarge machining. After casting, a wire is introduced through the starter hole 5 and arranged in a wire electrodischarge machining tool (not shown) on both sides of the vane 1. The coolant hole 3 is then cut out of the vane 1 by means of the wire progressing along the dashed line 4.

According to a second preferred embodiment, the starter hole 5 is drilled through the vane 1 after casting is completed. The internal hole 3 for coolant is then cut out of the vane 1, proceeding from the starter hole 5 in the manner stated above.

Figure 2:
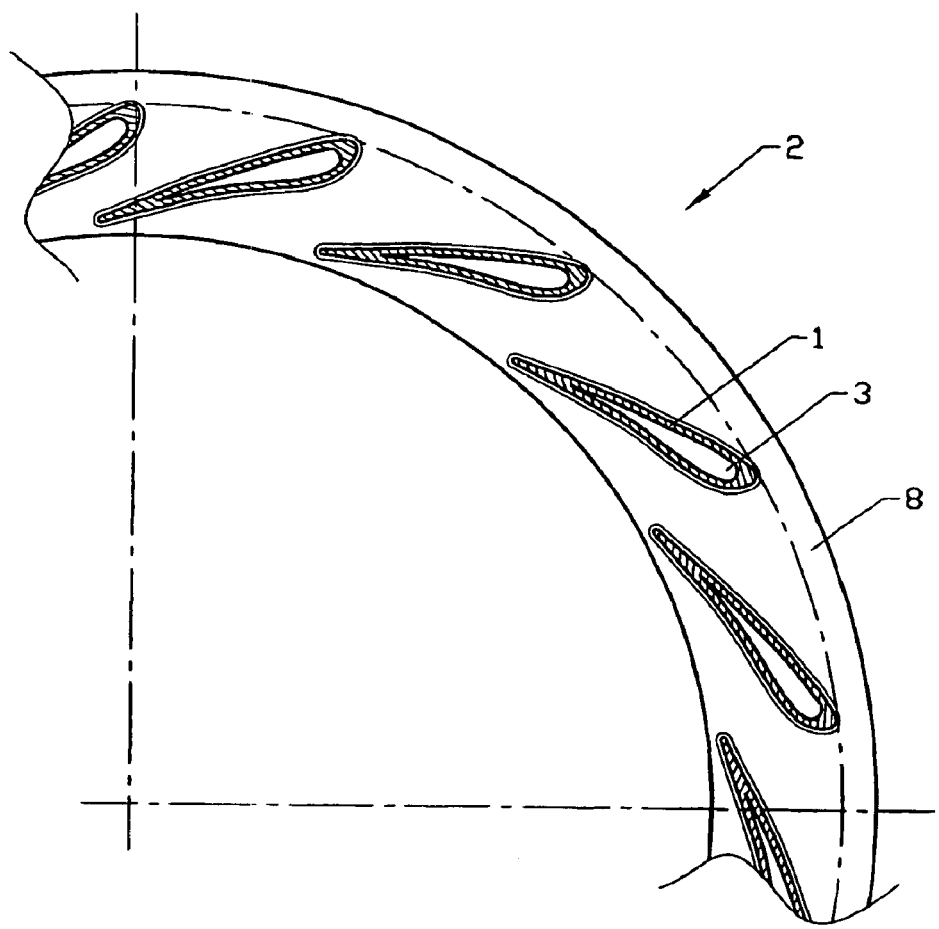
FIG. 2 is a cross-sectional view of a stator of the radial type having a plurality of vanes fitted therein.

The vane 1 shown in FIG. 1 further has a plurality of recesses 6 in proximity to its rear end 7. The recesses 6 are provided at the rear end 7 of the vane 1 during casting and are distributed along the width of the vane. The recesses 6 connect to the internal coolant hole 3 to produce strong and affective cooling of the vane 1 in the rear region 7. More specifically, the recesses 6 are connected to the internal coolant hole 3 during the cutting out of the hole 3.

The invention further relates to the manufacture of a gas turbine component in the form of a radial stator 2. According to a first exemplary embodiment, in a first stage, a vane holder structure 8 is manufactured by casting. In this step, the vane holder structure is cast so as to form sections, or seats, for receiving the vanes 1. The vanes 1, which can be manufactured according to any of the preceding embodiments, are then fitted in the vane holder structure 8.

According to a second example of the manufacture of a gas turbine component, in the form of a radial stator 2 and the component includes the vanes 1, is cast in a first casting stage. According to a first alternative, a core is used to define the starting hole 5 in each of the vanes 1 during the casting stage. In the second manufacturing stage, the internal hole 3 for coolant is cut out of each of the vanes 1, proceeding from the starter hole 5. The cutting of the starter hole 5 is done by the above-described wire electrodischarge machining method.

According to another alternative, in a first stage the gas turbine component 2 is cast without any starter hole 5. After the casting stage, a starter hole 5 is drilled into each of the vanes 1. The coolant hole 3 is then cut out of each of the vanes 1 by means of the said wire electrodischarge machining.

In the same way as stated above for manufacturing the vanes, each vane 1 in the turbine component 2 is provided during casting with a plurality of recesses 6 in proximity to its rear end.

Figure 3:
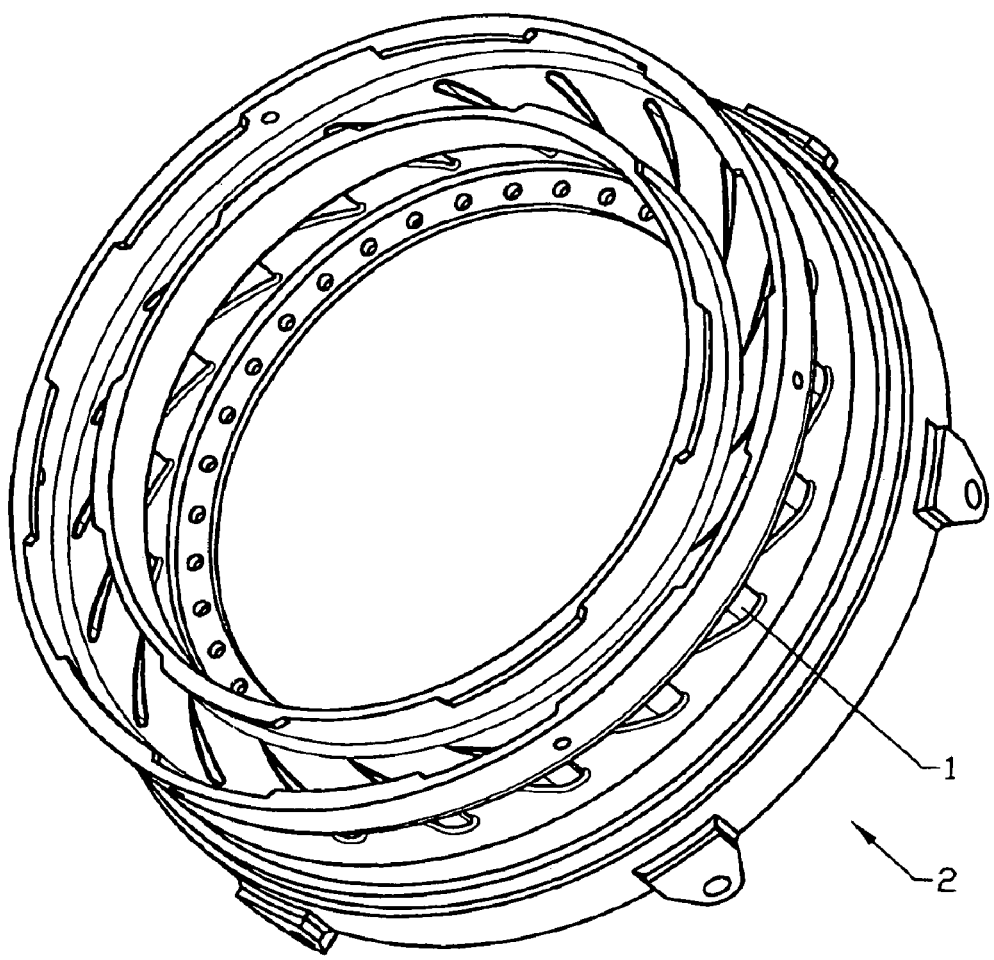
FIG. 3 is a perspective view of a radial-type stator manufactured by methods conducted according to the presently disclosed invention(s)

FIG. 3 illustrates a perspective view of the radial stator 2 manufactured by a method conducted according to one embodiment of the invention.

Figure 4:
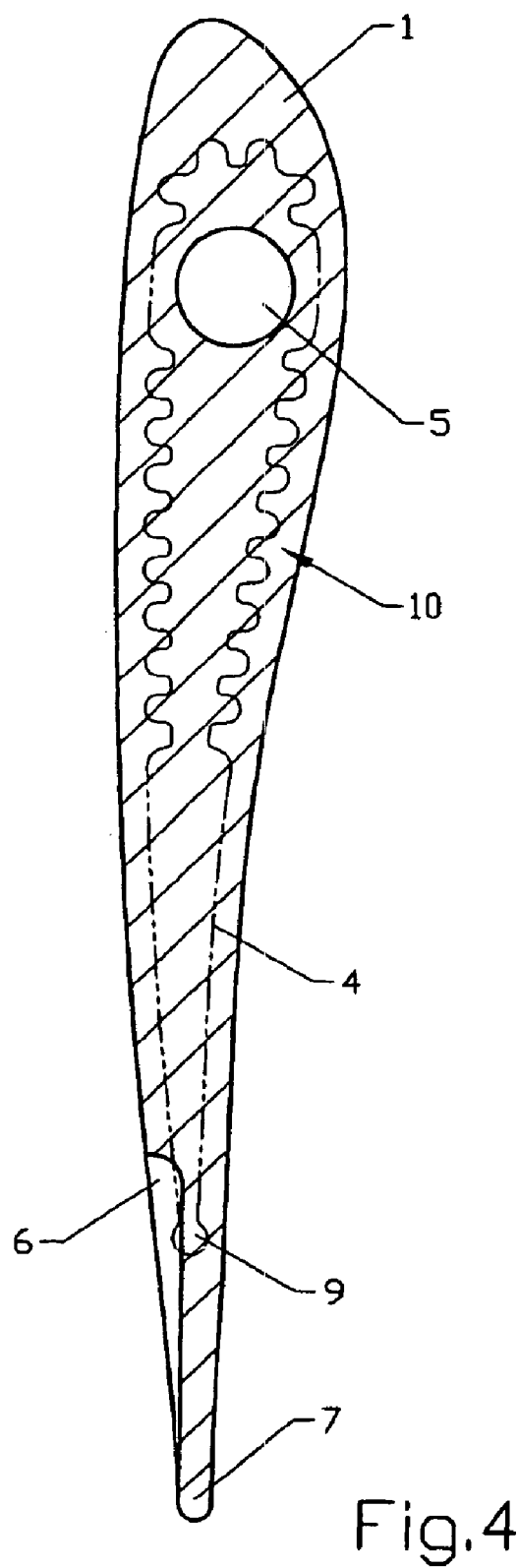
FIG. 4 shows a cross-sectional view of a vane for a stator of radial type after casting. More specifically, the figure shows an alternative embodiment of a coolant hole.

FIG. 4 illustrates an alternative embodiment of the coolant hole 3. What distinguishes this embodiment from that shown in FIG. 1 is that the surface of the vane 1 that defines the coolant hole 3 has, at least in part, an area 10 with alternating elevations and depressions. In this way, an enlarged cooling surface is obtained in the hole. The elevations form so-called cooling fins, which extend in the transverse direction of the vanes.

The gas turbine may be of both single-shaft and twin-shaft type. The term single-shaft gas turbine means that the compressor (or the compressors) is connected to the drive turbine by way of a shaft, and the drive turbine is connected to an output shaft. The combustion chamber is situated between the compressor(s) and the drive turbine. The term twin-shaft gas turbine means that the compressor (or compressors) is connected to a compressor turbine by way of a shaft. The drive turbine is not mechanically connected to the compressor turbine, but is situated downstream of the compressor turbine in the direction of the gas flow, and is connected to an output shaft. The combustion chamber is here situated between the compressor and the compressor turbine.

The method of processing by cutting that is described above enboth direct action on the material with a tool or cutting element, such as the wire, and action by means of a beam or the like, such as a laser beam.

The lost wax casting method is suitably used as a casting method of manufacture of the component, but other casting methods with high dimensional accuracy are also contemplated by the term casting as utilized herein. Methods using a ceramic core are, however, particularly, suited.

The invention should not be regarded as being confined to the embodiments of the invention described above; a number of modifications are conceivable without departing from the scope of the patent protection.

According to at least one alternative embodiment, with respect to the wire electrodischarge machining described above, the coolant hole can be cut out by conventional electrodischarge machining. In a further alternative for cutting out the coolant hole, laser cutting is used. In this case no starter hole is required for the machining. According to a further alternative, electrochemical processing is used for cutting out the coolant hole.

What is claim is:

1. A method for manufacturing a gas turbine component, said method comprising:
   casting a vane configured for guiding a gas flow;
   cutting out an internal hole in the vane for coolant; and
   cutting out the coolant hole so that a surface of the vane that defines the coolant hole has, at least in part, an area with alternating elevations and depressions.

2. A method for manufacturing a gas turbine component, said method comprising:
   casting a vane configured for guiding a gas flow;
   cutting out an internal hole in the vane for coolant; and
   providing the vane with at least one recess in proximity to a rear end thereof, and which is connected to the internal hole for coolant.

3. The method as recited in claim 2, further comprising:
   connecting the at least one recess to the internal hole for coolant during the cutting out of the internal hole.

4. The method as recited in claim 2, further comprising:
   locating the at least one recess at the rear end of the vane during casting.

5. The method as recited in claim 2, further comprising:
providing a vane holder structure; and
fitting a plurality of the manufactured vanes into the vane holder structure and thereby establishing a multi-vane gas turbine component.

6. The method as recited in claim 5, further comprising:
cast manufacturing the vane holder structure.

7. A method for manufacturing a gas turbine component comprising a plurality of vanes for guiding a gas flow, the method comprising:
casting a gas turbine component to include a plurality of vanes;
cutting an internal hole for coolant out of each of the vanes, post casting;
cutting out the coolant holes so that a surface of each of the plurality of vanes that defines respective coolant holes has, at least in part, an area with alternating elevations and depressions, each of said internal holes establishing an elongate plenum oriented substantially longitudinally within the respective vane, and each of said elongate plenums being formed by outwardly expanding an interior cavity within the respective vane and initiating from a starter hole.

8. A method for manufacturing a gas turbine component comprising a plurality of vanes for guiding a gas flow, the method comprising:
casting a gas turbine component to include a plurality of vanes;
cutting an internal hole for coolant out of each of the vanes, post casting;
providing each of the plurality of vanes with at least one recess in proximity to a rear end thereof, and which is connected to the internal hole in the particular vane for coolant, each of said internal holes establishing an elongate plenum oriented substantially longitudinally within the respective vane, and each of said elongate plenums being formed by outwardly expanding an interior cavity within the respective vane and initiating from a starter hole.

9. The method as recited in claim 7 or 8, further comprising:
an interior surface of each of said interior cavities having an area comprising alternating elevations and depressions for increasing thermal conductivity between cooling medium flowing through said plenum and said vane.

10. The method as recited in claim 7 or 8, further comprising:
utilizing wire electrodischarge machining for precision expansion of a respective starter hole into the respective interior cavity which is larger than said starter hole and thereby permitting imprecise initial positioning of said starter hole at an interior location of the respective vane that subsequently constitutes at least a portion of said interior cavity.

11. The method as recited in claim 7 or 8, further comprising:
connecting, in each of the plurality of vanes, a respective recess to an associated internal hole for coolant during the cutting out of the internal hole.

12. The method as recited in claim 7 or 8, further comprising:
locating, in each of the plurality of vanes, a respective recess at the rear end of the respective vane during casting.

13. A method for manufacturing a gas turbine component, said method comprising:
casting a vane configured for guiding a gas flow;
cutting out an internal hole in the vane for coolant;
providing the vane with a starter hole;
cutting out the internal hole for coolant by proceeding from the starter hole; and
said internal hole establishing an elongate plenum oriented substantially longitudinally within said vane; and
said elongate plenum being formed by outwardly expanding an interior cavity within said vane initiating from said starter hole.

14. A method for manufacturing a gas turbine component comprising a plurality of vanes for guiding a gas flow, the method comprising:
casting a gas turbine component to include a plurality of vanes;
cutting an internal hole for coolant out of each of the vanes, post casting;
providing each of the plurality of vanes with a starter hole;
cutting out each of the internal holes for coolant by proceeding from a respective starter hole, each of said internal holes establishing an elongate plenum oriented substantially longitudinally within the respective vane, and each of said elongate plenums being formed by outwardly expanding an interior cavity within the respective vane and initiating from a starter hole.

15. The method as recited in claim 13 or 14, further comprising:
casting each starter hole into the respective vane.

16. The method as recited in claim 13 or 14, further comprising:
machining each starter hole into the respective vane.

17. The method as recited in claim 13 or 14, further comprising:
cutting out each coolant hole by wire electrodischarge machining.

18. The method as recited in claim 13 or 14, further comprising:
casting a starter hole into each of the plurality of vanes.

19. The method as recited in claim 14, further comprising:
cutting out of the coolant holes by wire electrodischarge machining.

20. The method as recited in claim 13 or 14, further comprising:
providing each interior cavity with an interior surface having an area comprising alternating elevations and depressions for increasing thermal conductivity between cooling medium flowing through said plenum and said vane.

21. The method as recited in claim 7, 8, 13 or 14, further comprising:
utilizing wire electrodischarge machining for precision expansion of each of said starter holes into a respective interior cavity that is larger than the starter hole, and thereby permitting imprecise initial positioning of a starter hole at an interior location of said vane that subsequently constitutes at least a portion of said interior cavity.

* * * * *